(12) United States Patent
Yang et al.

(10) Patent No.: US 7,879,422 B2
(45) Date of Patent: Feb. 1, 2011

(54) OPTICAL DISC AND METHOD FOR FABRICATING THE SAME

(75) Inventors: Ting-Wei Yang, Hsinchu (TW); Sheng-Chih Wu, Hsinchu (TW)

(73) Assignees: Princo Corp., Hsinchu (TW); Princo America Corp., Fremont, CA (US)

( * ) Notice: Subject to any disclaimer, the term of this patent is extended or adjusted under 35 U.S.C. 154(b) by 610 days.

(21) Appl. No.: 11/551,716

(22) Filed: Oct. 22, 2006

(65) Prior Publication Data

US 2007/0098948 A1    May 3, 2007

(30) Foreign Application Priority Data

Nov. 3, 2005    (TW) .............................. 94138528 A

(51) Int. Cl.
*B32B 3/02* (2006.01)

(52) U.S. Cl. ................. 428/64.1; 428/64.4; 430/270.11

(58) Field of Classification Search ........................ None
See application file for complete search history.

(56) References Cited

U.S. PATENT DOCUMENTS

| | | | |
|---|---|---|---|
| 4,726,007 A | 2/1988 | McCormack | |
| 5,126,180 A | 6/1992 | Gotoh et al. | |
| 5,258,972 A | 11/1993 | Brasfield et al. | |
| 5,458,940 A | 10/1995 | Woo | |
| 5,999,513 A * | 12/1999 | Arakawa et al. | 369/282 |
| 6,214,430 B1 | 4/2001 | Kim et al. | |
| 6,461,711 B1 * | 10/2002 | Ishida et al. | 428/64.1 |
| 2001/0041304 A1 | 11/2001 | Uno et al. | |
| 2004/0209033 A1 | 10/2004 | Chu | |

FOREIGN PATENT DOCUMENTS

| | | |
|---|---|---|
| DE | 85 04 837.2 U1 | 9/1985 |
| DE | 689 25 349 T2 | 7/1996 |
| EP | 0 507 515 A2 | 10/1992 |
| EP | 1 043 719 A2 | 10/2000 |
| JP | 1990214078 | 8/1990 |
| JP | 1993182241 | 7/1993 |
| JP | 1996321072 | 12/1996 |
| JP | 1998208297 | 8/1998 |
| JP | 1998269620 | 10/1998 |
| JP | 2001084641 A | 3/2001 |
| JP | 2002170279 A | 6/2002 |
| JP | 2003006920 A | 1/2003 |
| JP | 2003331470 A | 11/2003 |
| TW | 200410235 | 6/2004 |
| WO | 01/93257 A1 | 12/2001 |

OTHER PUBLICATIONS

Chen et al., U.S. Appl. No. 12/549,341, "Optical Disc and Manufacturing Method Thereof", filed Aug. 27, 2009.

\* cited by examiner

*Primary Examiner*—Elizabeth Mulvaney
(74) *Attorney, Agent, or Firm*—Pai Patent & Trademark Law Firm; Chao-Chang David Pai

(57) ABSTRACT

An optical disc capable of suppressing vibration during read/write process includes an annular substrate, a coated layer, and a damping layer. The annular substrate includes a supporting portion and a recording portion, and a recording surface corresponding to the recording portion. The coated layer is formed on the recording surface. The damping layer is formed on the coated layer side of the annular substrate for increasing the response time to vibration of the optical disc. A method for fabricating the aforementioned optical disc is also disclosed.

22 Claims, 6 Drawing Sheets

OPTICAL DISC AND METHOD FOR FABRICATING THE SAME

BACKGROUND OF THE INVENTION a) Field of the Invention

The invention relates to an optical disc and a method for fabricating the same and, more particularly, to an optical disc capable of suppressing vibration while performing read/write and a method for fabricating such optical disc.

b) Description of the Related Art

An optical disc can store data in different formats and is the most convenient storage medium among the optical storage media of the new generation. In addition, an optical disc can be applied in many fields, including library archives, data backup, electronic publication, image data storage, and personal medical record management.

Shown in FIG. 1A is the top view of a conventional optical disc 1; the conventional optical disc 1 is annular and can be divided into an inner supporting portion 11 and an outer recording portion 12. The detailed structure of the conventional optical disc 1, as shown in FIG. 1B, includes an annular substrate 13, a coated layer 14, and a compensation sheet 15. The coated layer includes a recording layer 141, a reflective layer 142, and a protective layer 143, which are sequentially laminated on the annular substrate 13, forming the recording portion 12. The compensation sheet 15 is attached to the annular substrate 13 to cover the coated layer 14, thus yielding the product of optical disc 1.

To reduce manufacturing steps and lower production cost, another conventional form of optical disc 2 as shown in FIG. 2 has been developed. The main difference between the optical disc 2 and the optical disc 1 is that the optical disc 2 does not include a compensation sheet, and since the optical disc 2 lacks the compensation sheet, the thickness of the annular substrate 21 at the supporting portion 11 is increased so that a device for driving an optical disc can clamp the optical disc 2 effectively. For example, the thickness of optical disc 2 at the supporting portion 11 is about 1.2 mm, and at the recording portion, the thickness of optical disc 2 is about 0.6 mm.

Yet another conventional form of optical disc 3 is an improvement of the optical disc 2, wherein the difference is that the supporting portion 11 protruding from the annular substrate 33 has a plurality of indentations 31 on its outer periphery, as shown in FIG. 3A. Another difference is that the supporting portion 11 protruding from the annular substrate 33 has a slant face 32 extending outward from its outer periphery, as shown in FIG. 3B. The two abovementioned characteristics allow the annular substrate 33 to be easily fabricated and to have better mechanical properties.

It is inevitable that when an optical disc is revolving in a driving device, vibration is generated due to factors including rotation of the spindle of the driving device, vibration of the pick-up head of the driving device, and air turbulence occurring in the driving device. When resonance occurs between the optical disc and any of the aforementioned vibration factors, or during high-speed read/write process, the rotating speed of the spindle of the driving device increases greatly, and the vibration generated becomes more intense. The compensation sheet that the optical disc 1 has effectively increases the rigidity of the optical disc 1, and therefore prevents the optical disc from being deformed due to vibration during the read/write process. However, the rigidity of the compensation sheet 15 would lead to warping of the optical disc if the surface quality of the compensation sheet 15 is poor, and thus affect the read/write quality of the optical disc; the warping would even render the optical disc defective. The thickness of the optical discs 2, 3 at the recording portion 12 is only 0.6 mm, and so the optical discs 2, 3 are liable to be incompatible in high-speed read/write situations because of vibration.

To conclude from above, it is important to resolve the vibration problem of optical disc during read/write process at different speeds so that the compatibility of optical discs with insufficient rigidity can be enhanced and the optical discs can be produced more easily.

BRIEF SUMMARY OF THE INVENTION

In view of the aforementioned problems, an object of the invention is to provide an optical disc capable of suppressing vibration during read/write process and a method for fabricating such an optical disc, whereby the vibration of an optical disc can be lowered and the vibration problem at all read/write speeds can be solved, and so the compatibility of an optical disc having a recording portion and with insufficient rigidity can be enhanced. At the same time, when compared to the optical disc with compensation sheet, the optical disc of the invention is easy to produce and therefore the production cost is effectively lowered.

In order to achieve the abovementioned object, an optical disc capable of suppressing vibration during read/write process of the invention includes an annular substrate, a coated layer, and a damping layer. The annular substrate has an inner supporting portion, an outer recording portion, and a recording surface corresponding to the outer recording portion. The coated layer is formed on the recording surface. The damping layer is formed on the coated layer side of the annular substrate and is used to increase the response time to vibration of an optical disc.

The invention also discloses a method for fabricating the aforementioned optical disc. The method comprises steps of: fabricating an annular substrate including an inner supporting portion, an outer recording portion, and a recording surface corresponding to the outer recording portion; forming a coated layer on the recording surface; and forming a damping layer on the coated layer side of the annular substrate.

With the optical disc capable of suppressing vibration during read/write process of the invention, the vibration of an optical disc is effectively lowered, the vibration problem occurring at all read/write speeds is solved, and the compatibility of an optical disc having a recording portion and with insufficient rigidity is effectively enhanced. Moreover, warping of an annular substrate due to poor surface quality of a damping layer will not occur when the damping layer is formed attached to the annular substrate. Therefore, the optical disc is easy to produce, the yield is substantially increased, and the production cost is lowered.

DETAILED DESCRIPTION OF THE INVENTION

Figure 1A:
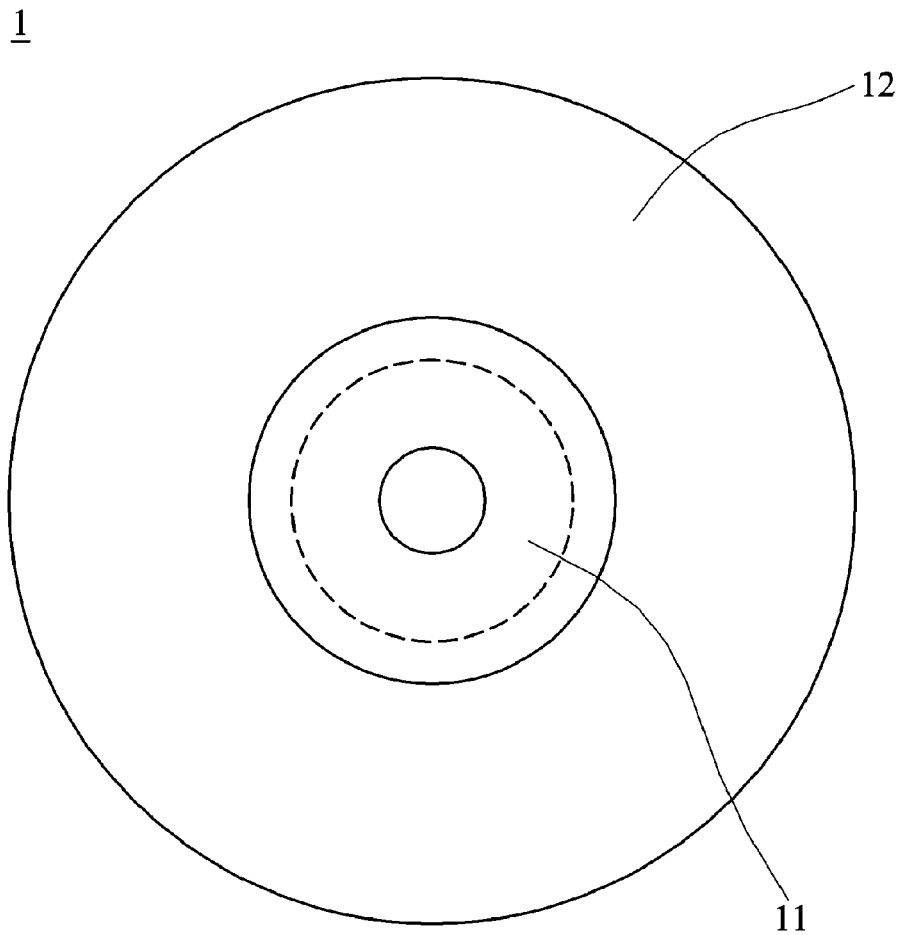
FIG. 1A is a schematic diagram illustrating the top view of a conventional optical disc.
Figure 1B:
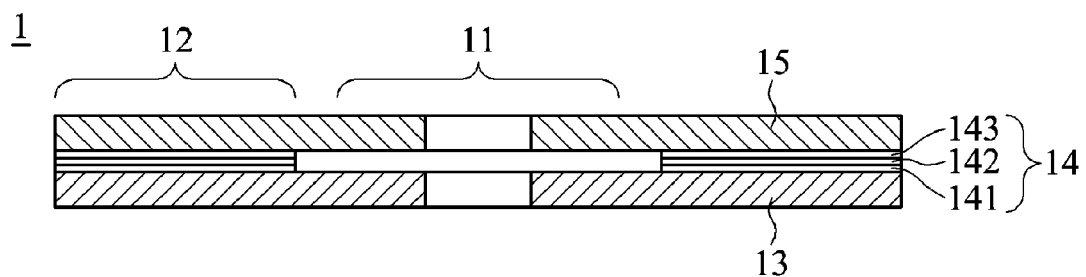
FIG. 1B is a schematic diagram illustrating the structure of the conventional optical disc shown in FIG. 1A.
Figure 2:
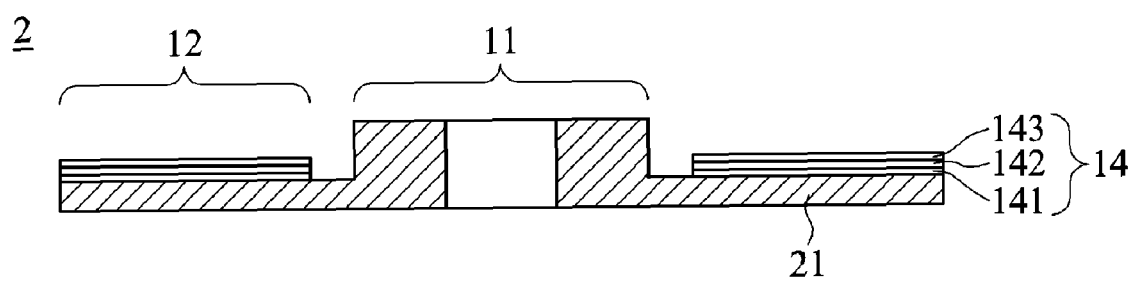
FIG. 2 is a schematic diagram illustrating the structure of another conventional optical disc.

The optical disc capable of suppressing vibration during read/write process and the method for fabricating such optical disc according to preferred embodiments of the invention will be described below with reference to the drawings, wherein the like reference numerals denote the like components.

Figure 4:
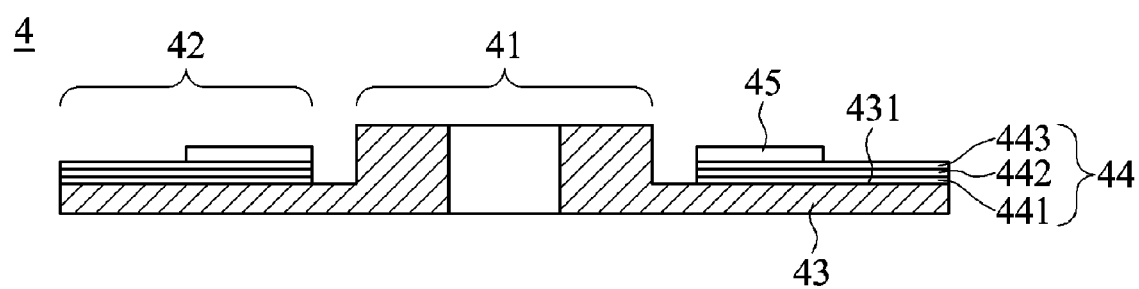
FIG. 4 is a schematic diagram illustrating the structure of an optical disc capable of suppressing vibration during read/write process according to a preferred embodiment of the invention.

Referring to FIG. 4, an optical disc 4 capable of suppressing vibration during read/write process according to a preferred embodiment of the invention includes an annular substrate 43, a coated layer 44, and a damping layer 45. The annular substrate 43 is provided with a supporting portion 41 on the inner side, a recording portion 42 on the outer side, and a recording surface 431 corresponding to the recording portion 42. The coated layer 44 is formed on the recording surface 431. The damping layer 45 is formed on the coated layer 44 side of the annular substrate 43, and is used for increasing the response time to vibration of the optical disc. In other words, the soft damping layer 45 is used to increase the damping coefficient of the optical disc 4, so that the ability of the optical disc to resist change (i.e., vibration) is enhanced.

In FIG. 4, the damping layer 45 is only formed on a portion of the optical disc 4; the preferred range of attachment is such that the outer diameter of the damping layer 45 is at least one third of the diameter of the optical disc 4. Take an optical disc with a diameter of 120 mm as an example; the outer diameter of the damping layer would be between 40 mm and 120 mm. Thus, the technical characteristic of the invention is applicable to optical discs of any size, e.g. an optical disc with its diameter between 110 mm and 130 mm, or between 70 mm and 90 mm.

Figure 3A:
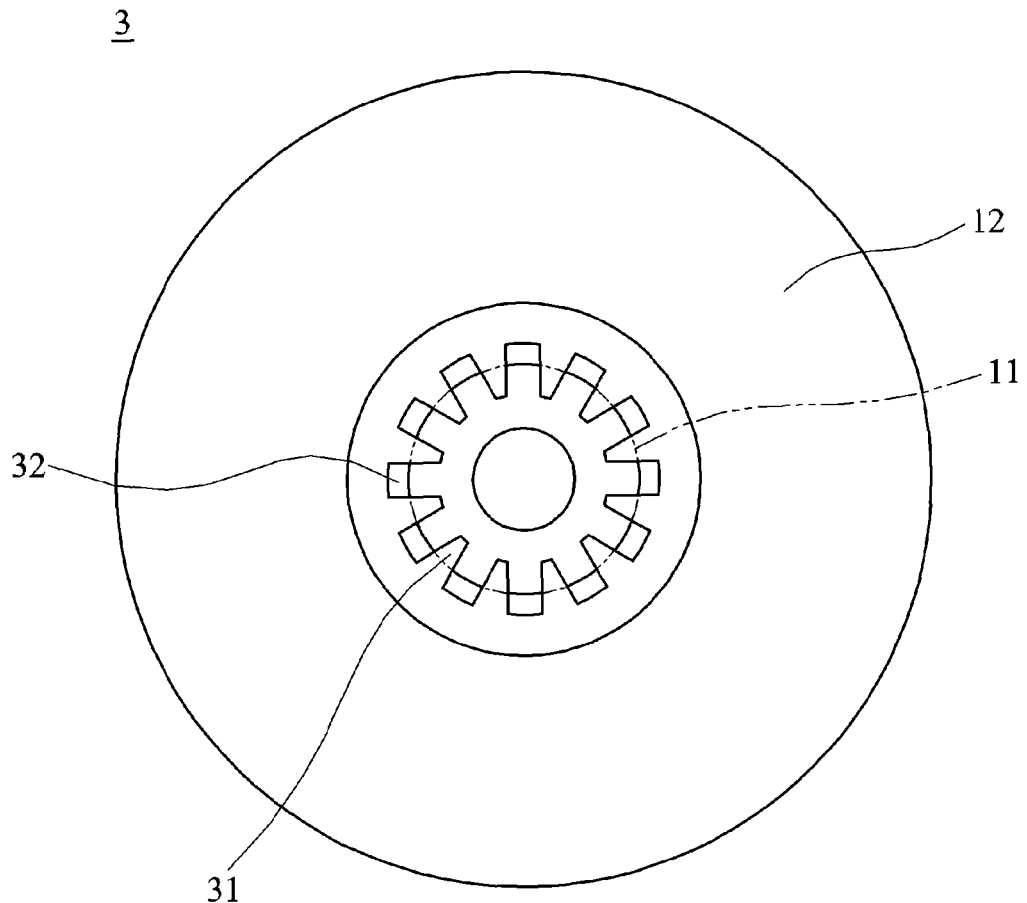
FIG. 3A is a schematic diagram illustrating the top view of yet another conventional optical disc.
Figure 3B:
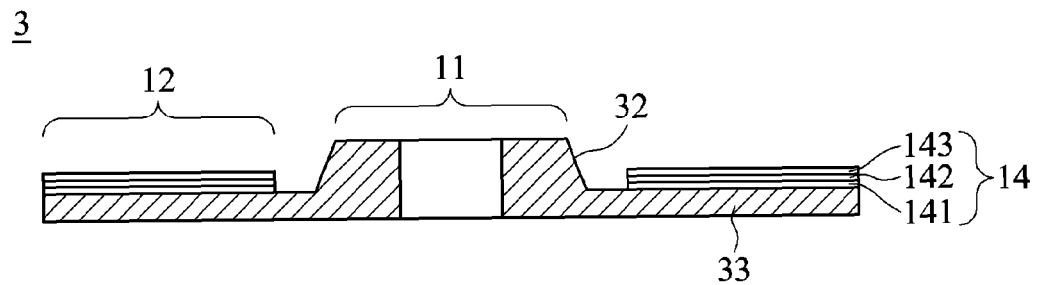
FIG. 3B is a schematic diagram illustrating the structure of the conventional optical disc shown in FIG. 3A.

For the optical disc 4 shown in FIG. 4, the thickness of the annular substrate 43 at the supporting portion 41 is greater than the thickness of the annular substrate 43 at the recording portion 42. For example, the thickness of the annular substrate 43 at the recording portion 42 is between 0.55 mm and 0.65 mm, and the thickness of the annular substrate 43 at the supporting portion 41 is between 0.66 mm and 1.6 mm. Likewise, the annular substrate 43 can be similar to the annular substrate 33 shown in FIG. 3, wherein the supporting portion 41 protruding from the recording surface 431 has a plurality of indentations on its outer periphery, and/or has a slant face extending outward from its outer periphery.

The coated layer 44 includes at least one recording layer 441, at least one reflective layer 442, and a protective layer 443. The recording layer 441 is laminated on the recording surface 431 and is composed of organic dye or inorganic dye. The reflective layer 442 is located on the recording layer 441 and is composed of metal. The protective layer 443 is located on the reflective layer 442.

Persons skilled in the art can modify the composition of a coated layer for different applications of an optical disc. For example, the coated layer 44 can include a first dielectric layer, a recording layer, a second dielectric layer, an isolation layer, a reflective layer, and a protective layer, which are sequentially laminated on the recording surface 431, wherein the recording layer is composed of alloy and the reflective layer is composed of metal. Likewise, if the optical disc is a read-only optical disc (ROM) where data is directly inscribed on the annular substrate 43, then the coated layer 44 merely includes a reflective layer, and more preferably further includes a protective layer.

Figure 5:
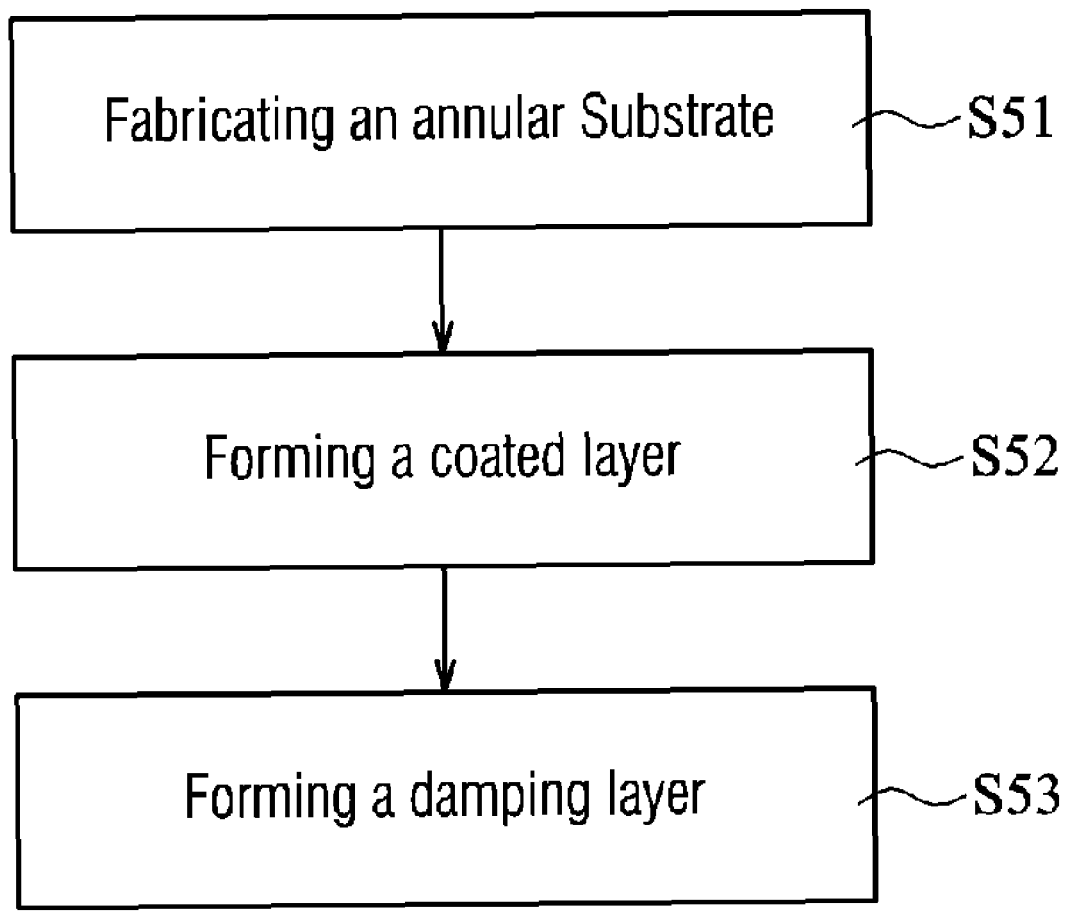
FIG. 5 is a flow chart illustrating a method for fabricating the optical disc of the invention.

FIG. 5 depicts a method for fabricating the abovementioned optical disc according to a preferred embodiment of the invention. First, an annular substrate 43 is fabricated (S51). Then, a coated layer 44 is formed on a recording surface 431 (S52). Last, a damping layer 45 is formed on the coated layer 44 side of the annular substrate 43(S53).

Figure 6A:
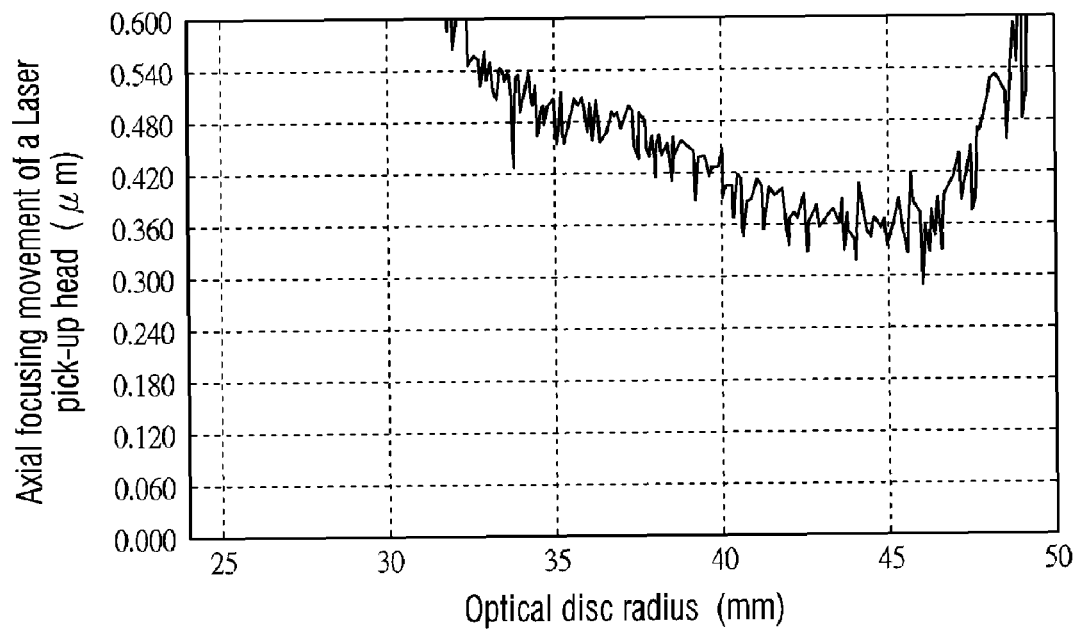
FIG. 6A is a graph illustrating the axial focusing movement of the laser pick-up head of a driving device when reading a conventional optical disc.
Figure 6B:
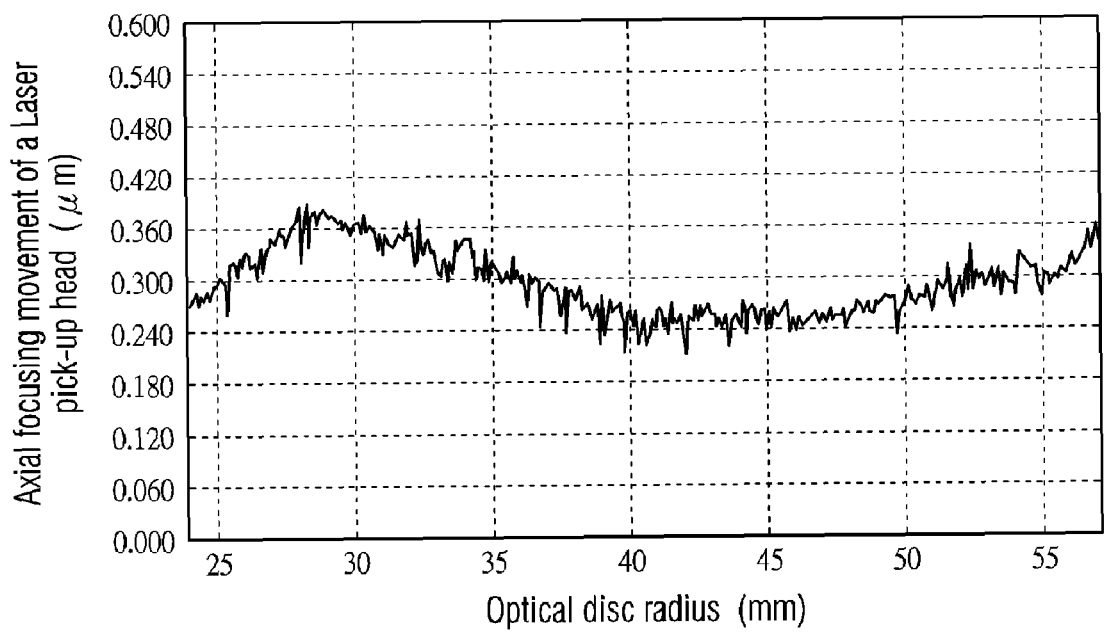
FIG. 6B is a graph illustrating the axial focusing movement of the laser pick-up head of a driving device when reading the optical disc of the invention.

FIG. 6A illustrates the axial focusing movement of a laser pick-up head of a driving device when reading a conventional optical disc, and FIG. 6B illustrates the axial focusing movement of a laser pick-up head of a driving device when reading an optical disc of the invention. In order to focus laser light on the coated layer of an optical disc, the laser pick-up head moves along with the vibration of the optical disc, and therefore the axial focusing movement of the laser pick-up head can show the vibration of an optical disc. From FIGS. 6A and 6B, it can be observed that regardless of the position in the radius of the optical disc of the invention the laser pick-up head is located at, its axial focusing movement is smaller than that of the laser pick-up head when it is located at the corresponding position in the radius of a conventional optical disc, which illustrates that the damping layer in the optical disc of the invention can effectively change and lower the vibration of an optical disc during read/write process.

It is to be noted that the aforementioned description is based on attaching a damping layer to a conventional optical disc without a compensation sheet. However, if an optical disc with a compensation sheet attached thereto still does not have sufficient rigidity, a damping layer can be formed on the compensation sheet to change and lower the vibration of the optical disc. And, when fabricating such kind of optical disc, the compensation sheet must be disposed before forming the damping layer.

With the optical disc capable of suppressing vibration during read/write process and the method for fabricating such optical disc of the invention, the vibration of the optical disc can be effectively changed and lowered after a damping layer is formed, the vibration problem occurring at all read/write speeds is solved, such that the compatibility of an optical disc having a recording portion and with insufficient rigidity is enhanced and so the optical disc can be read/written at different speeds. Moreover, the damping layer is composed of a soft material, and so when it is attached to the annular substrate, the annular substrate will not warp due to poor surface quality of the damping layer. Therefore, the optical disc is easy to produce, the yield is substantially increased, and the production cost is lowered.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. For example, a single-sided double layered optical disc or a multi-layered optical disc needs a reflective layer on its every recording layer, and so the coated layer of the optical disc of the invention may include more than one recording layer and reflective layer. Therefore, the scope of the appended claims should be accorded the broadest interpretation so as to encompass all such modifications and similar arrangements.

What is claimed is:

1. An optical disc capable of suppressing vibration during read/write process, comprising:
   an annular substrate having a supporting portion, a recording portion surrounding the supporting portion, and a recording surface corresponding to the recording portion;
   a coated layer formed on the recording surface; and
   a damping layer formed on the coated layer side of the annular substrate for increasing the response time to vibration of the optical disc,
   wherein the inner diameter of the damping layer is substantially equal to that of the coated layer, the outer diameter of the damping layer is larger than or equal to one third of the diameter of the optical disc and smaller than the diameter of the optical disc.

2. The optical disc capable of suppressing vibration during read/write process as described in claim 1, wherein the thickness of the annular substrate at the supporting portion is greater than the thickness of the annular substrate at the recording portion.

3. The optical disc capable of suppressing vibration during read/write process as described in claim 2, wherein the thickness of the annular substrate at the supporting portion is between 0.66 mm and 1.6 mm, and the thickness of the annular substrate at the recording portion is between 0.55 mm and 0.65 mm.

4. The optical disc capable of suppressing vibration during read/write process as described in claim 2, wherein the supporting portion of the annular substrate protruding from the recording surface has a plurality of indentations on its outer periphery.

5. The optical disc capable of suppressing vibration during read/write process as described in claim 4, wherein the outermost periphery of the supporting portion of the annular substrate protruding from the recording surface is a slant face.

6. The optical disc capable of suppressing vibration during read/write process as described in claim 1, wherein the diameter of the optical disc is between 110 mm and 130 mm, or between 70 mm and 90 mm.

7. The optical disc capable of suppressing vibration during read/write process as described in claim 1, further comprising:
   a compensation sheet disposed between the coated layer and the damping layer, such that the thickness of the annular substrate at the supporting portion is the same as the thickness of the annular substrate at the recording portion.

8. The optical disc capable of suppressing vibration during read/write process as described in claim 1, wherein the coated layer comprises:
   at least one recording layer laminated on the recording surface;
   at least one reflective layer respectively located on each of the at least one recording layer; and
   a protective layer located on the uppermost reflective layer.

9. The optical disc capable of suppressing vibration during read/write process as described in claim 8, wherein the reflective layer is composed of metal, and the recording layer is composed of organic dye or inorganic dye.

10. The optical disc capable of suppressing vibration during read/write process as described in claim 1, wherein the coated layer comprises:
    a first dielectric layer located on the recording surface;
    a recording layer located on the first dielectric layer;
    a second dielectric layer located on the recording layer;
    an isolation layer located on the second dielectric layer;
    a reflective layer located on the isolation layer; and
    a protective layer located on the reflective layer.

11. The optical disc capable of suppressing vibration during read/write process as described in claim 10, wherein:
    the recording layer is composed of alloy; and
    the reflective layer is composed of metal.

12. A method for fabricating an optical disc capable of suppressing vibration during read/write process, the method comprising:
    fabricating an annular substrate having a supporting portion, a recording portion surrounding the supporting portion, and a recording surface corresponding to the recording portion;
    forming a coated layer on the recording surface; and
    forming a damping layer on the coated layer side of the annular substrate for increasing the response time to vibration of the optical disc,
    wherein the inner diameter of the damping layer is substantially equal to that of the coated layer, the outer diameter of the damping layer is larger than or equal to one third of the diameter of the optical disc and smaller than the diameter of the optical disc.

13. The method for fabricating an optical disc capable of suppressing vibration during read/write process as described in claim 12, wherein the thickness of the annular substrate at the supporting portion is greater than the thickness of the annular substrate at the recording portion.

14. The method for fabricating an optical disc capable of suppressing vibration during read/write process as described in claim 13, wherein the thickness of the annular substrate at the supporting portion is between 0.66 mm and 1.6 mm, and the thickness of the annular substrate at the recording portion is between 0.55 mm and 0.65 mm.

15. The method for fabricating an optical disc capable of suppressing vibration during read/write process as described in claim 13, wherein the supporting portion of the annular substrate protruding from the recording surface has a plurality of indentations on its outer periphery.

16. The method for fabricating an optical disc capable of suppressing vibration during read/write process as described in claim 15, wherein the outermost periphery of the supporting portion of the annular substrate protruding from the recording surface is a slant face.

17. The method for fabricating an optical disc capable of suppressing vibration during read/write process as described in claim 12, wherein the diameter of the optical disc is between 110 mm and 130 mm, or between 70 mm and 90 mm.

18. The method for fabricating an optical disc capable of suppressing vibration during read/write process as described in claim 12, further comprising:
    disposing a compensation sheet between the coated layer and the damping layer, so that the thickness of the annular substrate at the supporting portion is the same as the thickness of the annular substrate at the recording portion.

19. The method for fabricating an optical disc capable of suppressing vibration during read/write process as described in claim 12, wherein the coated layer comprises:
    at least one recording layer laminated on the recording surface;
    at least one reflective layer respectively located on each of the at least one recording layer; and
    a protective layer located on the uppermost reflective layer.

20. The method for fabricating an optical disc capable of suppressing vibration during read/write process as described in claim 19, wherein the reflective layer is composed of metal and the recording layer is composed of organic dye or inorganic dye.

21. The method for fabricating an optical disc capable of suppressing vibration during read/write process as described in claim 12, wherein the coated layer comprises:

a first dielectric layer located on the recording surface;

a recording layer located on the first dielectric layer;

a second dielectric layer located on the recording layer;

an isolation layer located on the second dielectric layer;

a reflective layer located on the isolation layer; and a protective layer located on the reflective layer.

22. The method for fabricating an optical disc capable of suppressing vibration during read/write process as described in claim 21, wherein:

the recording layer is composed of alloy; and the reflective layer is composed of metal.

* * * * *